United States Patent [19]

Jones, Jr.

[11] Patent Number: 5,069,882
[45] Date of Patent: Dec. 3, 1991

[54] CARBON BLACK REACTOR WITH A CHOKE EXTENSION

[75] Inventor: William R. Jones, Jr., Monroe, La.

[73] Assignee: Columbian Chemicals Company, Atlanta, Ga.

[21] Appl. No.: 556,028

[22] Filed: Jul. 20, 1990

Related U.S. Application Data

[62] Division of Ser. No. 272,454, Nov. 17, 1988.

[51] Int. Cl.$^5$ .............................................. C09C 1/48
[52] U.S. Cl. ................................... 422/150; 422/151; 422/156; 422/158
[58] Field of Search ............... 423/445, 449, 450, 458; 422/151, 150, 156, 158

[56] References Cited

U.S. PATENT DOCUMENTS

| | | | |
|---|---|---|---|
| 2,440,423 | 4/1948 | Wiegand et al. | 422/151 |
| 3,922,335 | 11/1975 | Jordan et al. | 423/450 |
| 3,984,528 | 10/1976 | Cheng | 422/150 |
| 4,134,966 | 1/1979 | Austin | 422/108 |
| 4,228,131 | 10/1980 | Rothbühr et al. | 422/158 |
| 4,241,022 | 12/1980 | Kraus et al. | 422/156 |
| 4,320,090 | 3/1982 | Hunt | 422/159 |
| 4,619,812 | 10/1986 | Murray | 422/156 |
| 4,643,880 | 2/1987 | King et al. | 422/156 |
| 4,687,643 | 8/1987 | Cortesi et al. | 422/150 |
| 4,692,312 | 9/1987 | Dilbert et al. | 422/151 |

Primary Examiner—Peter Kratz
Attorney, Agent, or Firm—Jones, Askew & Lunsford

[57] ABSTRACT

A carbon black reactor having an extended reaction choke substantially reduces the presence of coke and refractory grit in the carbon black product and erosion of the carbon black reactor due to impingement of particles of forming carbon black within the reactor. The carbon black reactor generally comprises a reaction choke which extends into an exit chamber to an outlet opening within the exit chamber. Hot gas and particles of forming carbon black flow through the reaction choke, through the outlet opening into the exit chamber. The outlet opening of the reaction choke is located within the exit chamber sufficiently distal from the upstream end of the exit chamber to substantially eliminate impingement of the particles of forming carbon black against the upsteam end of the exit chamber.

4 Claims, 1 Drawing Sheet

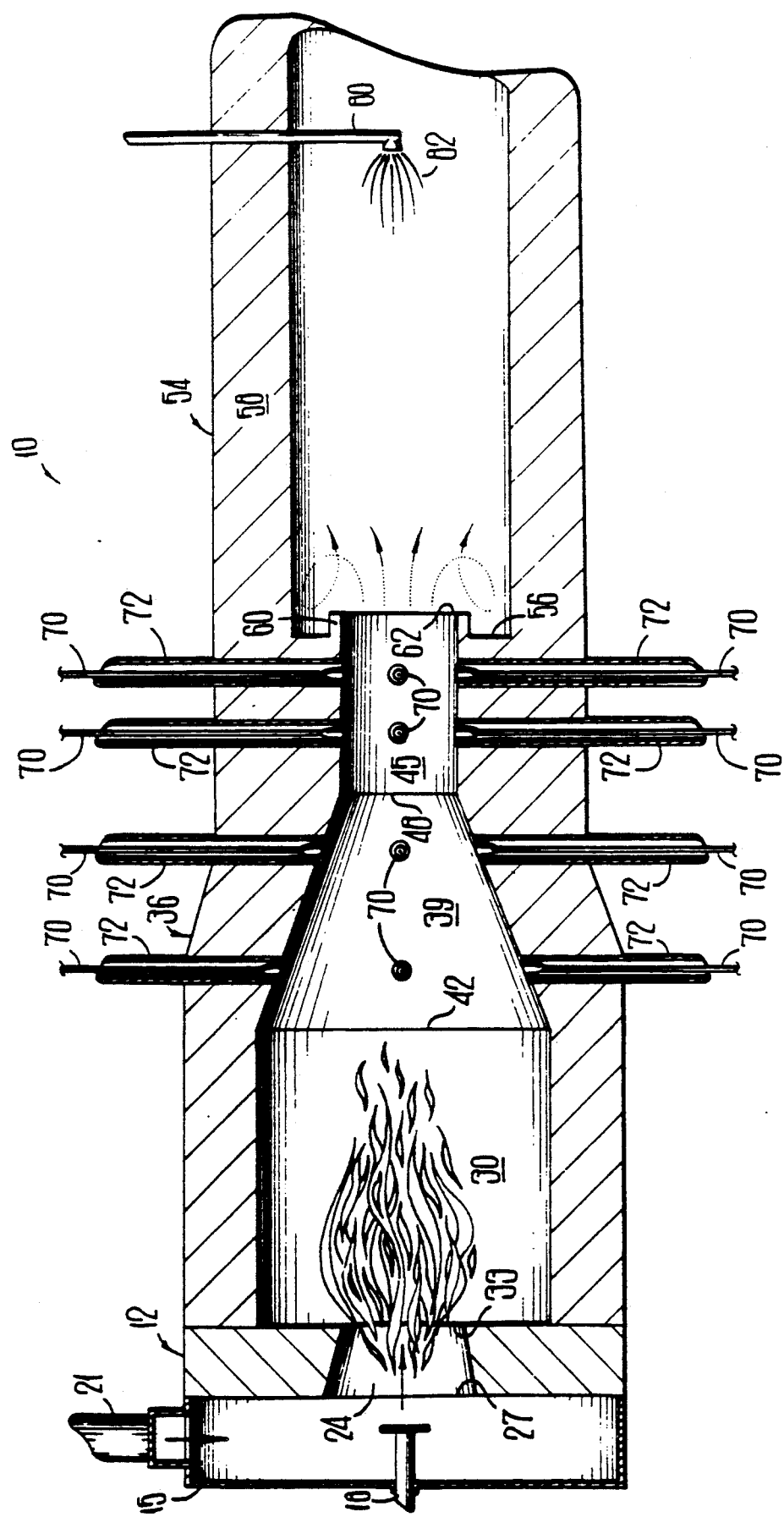

CARBON BLACK REACTOR WITH A CHOKE EXTENSION

This is a division of application Ser. No. 07/272,454, filed on Nov. 17, 1988.

TECHNICAL FIELD

This invention relates generally to the production of carbon black and specifically relates to the prevention of the impingement of feedstock hydrocarbon within carbon black reactors.

BACKGROUND OF THE INVENTION

The basic method for the production of carbon black is well known. Generally, carbon black is produced by injecting a hydrocarbon raw material (hereinafter called "feedstock hydrocarbon") into a flow of hot oxygen-containing gas wherein the feedstock hydrocarbon is pyrolyzed and converted into a smoke before being quenched by a water spray. The hot gas is produced by burning fuel in a combustion chamber. The hot gas flows from the combustion chamber into an reaction chamber which is in open communication with the combustion chamber. The feedstock hydrocarbon is introduced into the hot gas as the hot gas flows through the reaction chamber, thereby forming a reaction mixture comprising particles of forming carbon black. The reaction mixture flows from the reactor into an exit chamber which is in open communication with the reaction chamber. At some location in the exit chamber, a quench spray is introduced into the flowing reaction mixture thereby lowering the temperature of the reaction mixture below the temperature necessary for carbon black production and halting the carbon formation reaction. The black particles are then separated from the flow of hot gas.

Conventional carbon black reactors normally comprise a cylindrical combustion chamber axially connected to one end of a cylindrical or frusto-conical reaction chamber. A reaction choke is often axially connected to the other end of the reaction chamber. The reaction choke has a diameter substantially less than the diameter of the reaction chamber and connects the reaction chamber to an exit chamber. The exit chamber is normally cylindrical and has a diameter which is substantially larger than the diameter of the reaction choke. Because the diameter of the exit chamber is substantially larger than the diameter of the reaction choke, there is an abrupt, ninety degree expansion in diameter from the reaction choke to the exit chamber.

During operation of these abrupt expansion reactors, the feedstock hydrocarbon is introduced into the flow of hot gas as the flow of hot gas passes through the reaction chamber and choke, thereby forming a flowing reaction mixture comprising hot gas and particles of forming carbon black. As the flowing reaction mixture passes from the reaction choke into the exit chamber, the flowing reaction mixture is subjected to an immediate expansion. As a result, some of the reaction mixture flows laterally towards the inner wall of the exit chamber from the reaction choke and forms eddies in the exit chamber near the outlet of the reaction choke. This effect is often referred to as "backmixing" and can cause the particles of forming carbon black to impinge against the inner wall of the exit chamber in the proximity of the reaction choke outlet.

The inner surface of the exit chamber, heated by the hot gas flowing through the exit chamber, normally has a temperature between about 3200° F. to 3500° F. during operation. The particles of forming carbon black which impinge on the inner surface of the exit chamber are substantially cooler than the inner surface of the exit chamber, and thus the impingement of the relatively cool particles of forming carbon black on the relatively hot inner surface of the exit chamber causes thermal shock to the exit chamber. The thermal shock erodes the inner surface of the exit chamber. The eroded portion of the exit chamber enters the flow of hot gas and results in an impurity called "refractory grit" in the carbon black product. The erosion of the exit chamber also reduces the operating life of the carbon black reactor and thus increases the cost of carbon black production.

In addition to eroding the inner surface of the exit chamber, the particles of forming carbon black which impinge on the inner surface of the exit chamber are transformed into coke by the high-temperature inner surface of the exit chamber or by rapid cooling of the particles of forming carbon black before the particles are completely transformed into carbon black. The impingement coke is a hard carbon substance with properties very different from carbon black. The impingement coke tends to enter the flow of hot gas along with the refractory grit, resulting in another impurity in the carbon black product. The presence of impurities such as refractory grit and impingement coke reduces the quality of the carbon black product and thus reduces the commercial value of the carbon black product.

Therefore, there is a need for a carbon black reactor wherein the impingement of feedstock hydrocarbon on the inner surface of the reactor is substantially reduced.

SUMMARY OF THE INVENTION

The present invention solves the above described problems in the prior art by providing a carbon black reactor wherein the reaction mixture of hot gas and particles of forming carbon black are introduced into the exit chamber at a location within the exit chamber sufficiently distal from the upstream end of the exit chamber to substantially eliminate impingement of the particles of forming carbon black against the upstream end of the exit chamber. Because the reaction mixture is introduced into the exit chamber distal from the upstream end of the exit chamber, the backmixing of the expanding reaction mixture does not reach the upstream end of the exit chamber and the particles of forming carbon black do not impinge against the upstream end. Instead, the particles of forming carbon black are eventually carried forward through the exit chamber.

Stated more specifically, the apparatus of the present invention comprises an exit chamber having an outer shell with an upstream end and a downstream opening. The apparatus of the present invention also comprises a reaction choke connected to the upstream end of the exit chamber, the reaction choke having a cross section substantially smaller than the cross section of the exit chamber. A reaction choke extension extends from the upstream end of the exit chamber into the exit chamber to an outlet opening. The apparatus of the present invention produces a flowing reaction mixture comprising hot gas and particles of forming carbon black which travels through the choke and into the exit chamber. The reaction choke extension has a length sufficient to substantially eliminate impingement of the particles of forming carbon black against the upstream end of the exit chamber as the reaction mixture flows from the reaction choke into the exit chamber. The reaction mixture flowing from the outlet of the reaction choke undergoes backmixing, but the backmixing reaction mixture does not reach the upstream end of the exit chamber shell. Accordingly, the particles of forming carbon black do not impinge against the upstream end of the exit chamber shell and the production of coke and the erosion of the upstream end of the exit chamber shell is substantially reduced. Further, because the production of coke and refractory grit is substantially reduced, the overall quality of the resulting carbon black product is improved. Also, because the erosion of the exit chamber shell is substantially reduced, the operating life of the carbon black reactor is increased.

Therefore, an object of the present invention is to provide an improved reactor and method for producing carbon black.

Another object of the present invention is to provide a reactor and method for producing carbon black with less impurities.

Another object of the present invention is to provide a carbon black reactor with a longer operating life.

Other objects, features, and advantages will become apparent from reading the following specifications in conjunction with the accompanying drawing.

BRIEF DESCRIPTION OF THE DRAWING

The FIGURE is a schematic sectioned plan view of a carbon black reactor according to a preferred embodiment of the present invention.

DETAILED DESCRIPTION OF THE PREFERRED EMBODIMENT

Turning to the FIGURE, a carbon black reactor 10 is shown comprising a combustion section 12. The combustion section 12 comprises a cylindrical air inlet chamber 15 having an inlet opening 18 in the upstream end of the air inlet chamber for the introduction of the hydrocarbon burner and a second opening 21 in the peripheral wall of the air inlet chamber for the introduction of an oxygen-containing gas. A combustion choke 24 extends from the downstream end of the air inlet chamber 15 and is axially aligned with the air inlet chamber. The combustion choke is in open communication with the air inlet chamber 15 through an opening 27 in the downstream end of the air inlet chamber. A cylindrical combustion chamber 30 is mounted to the downstream end of the combustion choke 24. The combustion chamber 30 is axially aligned with the combustion choke 24 and the air inlet chamber 15 and extends forward from the downstream end of the combustion choke. The combustion chamber 30 is in open communication with the combustion choke 24 through an opening 33 in the upstream end of the combustion chamber.

The reactor 10 also includes a reaction section 36 axially aligned with the combustion section 12. The reaction section 36 comprises a conical reaction chamber 39 extending forward from the downstream end of the combustion chamber. The reaction chamber 39 is in open communication with the combustion chamber 30 through the open downstream end 42 of the combustion chamber. The reaction chamber 39 has an inner diameter which gradually decreases as the reaction chamber converges towards a cylindrical reaction choke 45. The reaction choke 45 extends forward from the converging end of the reaction chamber 39, and the reaction choke is in open communication with the reaction chamber through an opening 48 in the converging end of the reaction chamber.

A cylindrical exit chamber 54 with an inner diameter substantially greater than the inner diameter of the reaction choke 45 is mounted to the downstream portion of the reaction choke. The exit chamber 54 comprises an annular upstream wall 56 surrounding the reaction choke 45 and a cylindrical outer shell 58 extending forward from the annular upstream wall towards a downstream opening. An extension 60 of the reaction choke 45 having an inner diameter substantially equal to the inner diameter of the reaction choke extends from the annular upstream wall 56 forwardly into the exit chamber 54 to an outlet opening 62. The extension 60 of the reaction choke 45 extends a length into the exit chamber 54 sufficient to substantially eliminate the impingement of the particles of forming carbon black in the reaction mixture against the annular upstream wall 56, as will be discussed hereinbelow in describing the operation of the reactor 10. The extension 60 of the reaction choke 45 preferably extends into the exit chamber 54 about one inch from the annular upstream wall 56. However, it should be understood that the length of the extension 60 necessary to prevent impingement of the particles of forming carbon black against the annular upstream wall 56 depends on the degree of backmixing which occurs when the flowing reaction mixture enters the exit chamber 54. The greater the degree of backmixing, the longer the extension 60 of the reaction choke 45 must be to prevent the impingement of the particles of forming carbon black against the annular upstream wall 56.

Feedstock hydrocarbon injection nozzles 70 are preferably positioned along the length of the reaction chamber 39 and the reaction choke 45. The feedstock hydrocarbon injection nozzles 70 extend through the outer walls of the reaction chamber 39 and the reaction choke 45 and protrude into the interior of the carbon black reactor 10. The injection nozzles 70 are cooled by an annular flow of air through annular conduits 72 which encase the injection nozzles. Although four sets of feedstock hydrocarbon injection nozzles are shown in the Figure, it should be understood that the reactor of the present invention is not limited to a specific number of feedstock hydrocarbon injection nozzles.

A quench spray nozzle 80 extends into the exit chamber 54 at a location distal from the outlet opening 62 in the extension 60 of the reaction choke 45. The exit chamber 54 leads to a carbon black recovery system. Carbon black recovery systems are well known to those skilled in the art and thus are not discussed here in detail.

Although the carbon black reactor 10 shown in the figure is shown having a cylindrical cross-section, it should be understood that carbon black reactors having non-cylindrical cross-sections can be used to practice the present invention.

The carbon black production process begins in the combustion section 12 of the carbon black reactor 10 where a hydrocarbon material such as natural gas is mixed with an oxygen-containing gas such as air and combusted. A quantity of oxygen-containing gas in excess of or equal to the amount necessary for complete combustion of the hydrocarbon material is introduced through the air inlet opening 21 in the air inlet chamber 15. The hydrocarbon material is introduced through the hydrocarbon inlet opening 18 in the air inlet chamber 15. The hot gas produced by the combustion of the hydrocarbon in the oxygen-containing gas flows substantially axially through the reactor 10, that is, the hot gas flows substantially parallel to the longitudinal axis of the reactor. The hot gas flows substantially axially from the air inlet chamber 15, through the opening 27 in the downstream end of the air inlet chamber, axially through the combustion choke 24, through the opening 33 in the upstream end of the combustion chamber 30, and then axially through the combustion chamber towards the reaction chamber 39. As the hot combustion gas flows axially through the converging reaction chamber 39, through the opening 48 in the convergent end of the reaction chamber, and axially through the reaction choke 45, feedstock hydrocarbon is injected through the injection nozzles 70 into the flow of hot combustion gas. The hot oxygen-containing combustion gas pyrolyzes the feedstock hydrocarbon as the feedstock hydrocarbon enters the flow of hot oxygen-containing gas, thereby forming a flowing reaction mixture comprising hot gas and particles of forming carbon black. The flowing reaction mixture travels axially through the reaction choke 45, through the outlet opening 62 and into the exit chamber 54.

As the flowing reaction mixture enters the exit chamber 54 from the outlet opening 62 of the reaction choke 45, the reaction mixture is subjected to an abrupt expansion due to the sudden increase in diameter from the reaction choke extension to the exit chamber 54. Accordingly, the flowing reaction mixture undergoes a degree of backmixing wherein the particles of forming carbon black are carried back towards the annular upstream wall 56 of the exit chamber. However, because the outlet opening 62 of the reaction choke 45 is positioned distal from the annular upstream wall 56, the particles of forming carbon black do not reach the annular upstream wall; instead, the particles of forming carbon black are eventually carried by the flow of hot gas towards the quench spray 82 discharged by the quench spray nozzle 80. The quench spray 82, normally water, lowers the temperature of the flow of hot gas to a temperature below that required for carbon black formation, thereby halting or "quenching" the carbon formation reaction. The cooled gas and the particles of formed carbon black then flow from the exit chamber to a carbon black recovery system. The construction and operation of carbon black recovery systems are well known to those skilled in the art and thus are not discussed here in detail.

The extension 60 of the reaction choke 45 which extends from the annular upstream wall 56 into the exit chamber 54 prevents impingement of the particles of forming carbon black against the annular upstream wall. By reducing the impingement of the particles of forming carbon black, the presence of impurities such as impingement coke and refractory grit in the carbon black product is substantially reduced. Further, by reducing the impingement of the feedstock hydrocarbon, erosion of the exit chamber is reduced and the operating life of the carbon black reactor is increased.

Although the combustion section of the preferred embodiment of the present invention is shown as producing an axial flow through the carbon black reactor, it should be understood that a combustion section which produces tangential flow can also be used with the present invention.

It should be further understood that the foregoing relates only to a preferred embodiment of the present invention, and that numerous changes and modifications therein may be made without departing from the spirit and scope of the invention as defined in the following claims.

I claim:

1. Apparatus for the production of carbon black, comprising:
    a first outer refractory shell defining an exit chamber and a first cross section, the outer shell having an upstream end with an upstream opening and a downstream opening distal from the upstream end;
    a second outer refractory shell defining a reaction choke, the reaction choke extending from an inlet to the upstream end so that there is open flow communication from the choke through the upstream opening in the upstream end;
    a third refractory shell defining a combustion section in open flow communication with the reaction choke;
    means operatively associated with the combustion section for producing a flow of hot gas through the reaction choke into the exit chamber and through the exit chamber, the hot gas having a temperature sufficient to pyrolyze feedstock hydrocarbon and create a carbon black forming reaction;
    means positioned upstream of the exit chamber for introducing feedstock hydrocarbon into the flow of hot gas to form a flowing reaction mixture comprising hot gas and particles of forming carbon black; and
    refractory means for defining a reaction choke outlet extension extending from the upstream end to an outlet opening within the exit chamber, the second outer refractory shell defining a second cross section substantially smaller than the first cross section, the extension defining means having a length sufficient to substantially eliminate impingement of the particles of forming carbon black against the upstream end of the first outer refractory shell,
    whereby production of the coke and erosion of the upstream end of the outer shell is substantially reduced.

2. Apparatus for the production of carbon black as in claim 1, wherein the first, second and third outer refractory shells are aligned along a longitudinal axis and further comprising:
    means for directing the flowing reaction mixture axially through the reaction choke and the exit chamber in a direction substantially parallel to the longitudinal axis.

3. Apparatus for the production of carbon black, comprising:
    a first cylindrical outer refractory shell defining an elongated exit chamber, the first cylindrical outer shell having an annular upstream wall defining an upstream opening, a first inner diameter, and a downstream opening distal from the annular upstream wall;
    a second cylindrical outer refractory shell defining a cylindrical reaction choke, the second cylindrical outer shell having a second inner diameter substantially less than the first inner diameter, the second cylindrical outer shell extending from an inlet to the upstream wall so that there is open flow communication from the choke through the upstream opening in the upstream wall;

a third cylindrical outer refractory shell defining a combustion section in open flow communication with the reaction choke;

means for producing a flow of hot gas through the reaction choke into the exit chamber and through the exit chamber, the hot gas having a temperature sufficient to pyrolyze feedstock hydrocarbon and create a carbon black forming reaction;

means positioned upstream of the exit chamber for introducing feedstock hydrocarbon into the flow of hot gas to form a flowing reaction mixture comprising hot gas and particles of forming carbon black; and refractory means for defining a cylindrical reaction choke outlet extension extending from the annular upstream wall to an outlet opening within the exit chamber, the extension defining means having a third inner diameter equal to the second inner diameter, and the extension defining means having a length sufficient to substantially eliminate impingement of the particles of forming carbon black against the annular upstream wall, whereby production of coke and erosion of the annular upstream wall is substantially reduced.

4. Apparatus for the production of carbon black as in claim 3, wherein the first, second and third outer refractory shells are aligned along a longitudinal axis, and further comprising:

means for directing the flowing reaction mixture axially through the reaction choke and the exit chamber in a direction substantially parallel to the longitudinal axis.

* * * * *